US008657050B2

(12) United States Patent
Yamaguchi

(10) Patent No.: US 8,657,050 B2
(45) Date of Patent: Feb. 25, 2014

(54) SADDLE-RIDE TYPE VEHICLE

(75) Inventor: Hiromasa Yamaguchi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 13 days.

(21) Appl. No.: 13/474,026

(22) Filed: May 17, 2012

(65) Prior Publication Data

US 2013/0306393 A1 Nov. 21, 2013

(51) Int. Cl.
*B60K 13/02* (2006.01)

(52) U.S. Cl.
USPC ........................ 180/68.3; 180/291; 123/198 E

(58) Field of Classification Search
USPC ...................... 180/291, 219, 68.1, 68.2, 68.3; 123/198 E, 184.53, 184.57
See application file for complete search history.

(56) References Cited

U.S. PATENT DOCUMENTS

| | | | | |
|---|---|---|---|---|
| 7,407,179 | B2 * | 8/2008 | Tsuruta et al. | 280/727 |
| 7,448,664 | B2 * | 11/2008 | Karube et al. | 296/65.03 |
| 7,614,380 | B2 | 11/2009 | Tsutsui et al. | |
| 7,686,873 | B2 | 3/2010 | Kawatani | |
| 7,703,569 | B2 * | 4/2010 | Miyabe | 180/219 |
| 7,712,562 | B2 | 5/2010 | Nozaki | |
| 2007/0095324 | A1 * | 5/2007 | Takahashi et al. | 123/198 E |
| 2012/0060799 | A1 * | 3/2012 | Wakabayashi et al. | 123/495 |

* cited by examiner

*Primary Examiner* — John Walters
(74) *Attorney, Agent, or Firm* — Rankin, Hill & Clark LLP

(57) ABSTRACT

A saddle-ride type vehicle includes an engine attached to a body frame and a fuel tank disposed above the engine. A seat is attached to the body frame on a rear side of the fuel tank via a pair of engagement members in spaced relation to one another. The engagement members define a space therebetween. A throttle body associated with the engine is disposed below a forward portion of the seat. A resonator is coupled to an air intake. The resonator is positioned on an upper side of the throttle body and covers and protects the throttle body.

20 Claims, 3 Drawing Sheets

SADDLE-RIDE TYPE VEHICLE

BACKGROUND

Exemplary embodiments herein generally relate to a saddle-ride type vehicle such as an ATV (All Terrain Vehicle), and more particularly a saddle-ride type vehicle having a particular positional arrangement of a resonator and a throttle body of an engine which eliminates the need for a separate protective cover for the throttle body.

A typical saddle-ride type vehicle such as an ATV includes an engine mounted at a substantially central portion of a body frame. A fuel tank is disposed above the engine and a seat on which a rider is seated is disposed on the rear side of the fuel tank. In most ATV's, an air cleaner is disposed below the seat so that the outside air that has passed through the air cleaner is taken into the engine through a throttle body. Like the air cleaner, the throttle body is also disposed below the seat and thus is directly exposed to the outside when the seat is lifted or removed. To protect the throttle body, a protector cover is disposed over the throttle body so that an upper side of the throttle body is not directly exposed to the outside of the ATV. With this known arrangement, a resonator for attenuating intake noises is disposed below the throttle body. However, with the protective cover, additional manufacturing costs and weight is associated with the ATV.

BRIEF DESCRIPTION

In accordance with one aspect, a saddle-ride type vehicle comprises an engine attached to a body frame and a fuel tank disposed above the engine. A seat is attached to the body frame on a rear side of the fuel tank via a pair of engagement members in spaced relation to one another. The engagement members define a space therebetween. A throttle body associated with the engine is disposed below a forward portion of the seat. A resonator is coupled to an air intake. The resonator is positioned on an upper side of the throttle body and covers and protects the throttle body thereby eliminating the need for a separate protective cover.

In accordance with another aspect, a saddle-ride type vehicle comprises an engine attached to a body frame and a fuel tank disposed above the engine. A seat is attached to the body frame on a rear side of the fuel tank via a pair of engagement members in spaced relation to one another. The engagement members define a space therebetween. A throttle body associated with the engine is disposed below a forward portion of the seat. A resonator is coupled to an air intake. The resonator is positioned on an upper side of the throttle body. A periphery of the resonator substantially encompasses and covers the throttle body so as to cover and protect the throttle body. The positioning of the resonator relative to the throttle body eliminates the need for a separate protective cover.

In accordance with yet another aspect, a method of protecting a throttle body of a saddle-type vehicle is provided. The saddle-type vehicle includes an engine attached to a body frame and a fuel tank disposed above the engine. A seat is attached to the body frame on a rear side of the fuel tank via a pair of seat hooks in spaced relation to one another. A resonator is coupled to an air intake. The method comprises positioning the throttle body below a forward portion of the seat and between the pair of seat hooks; and positioning the resonator directly above the throttle body and between the pair of seat hooks so that a periphery of the resonator substantially encompasses and covers the throttle body.

DETAILED DESCRIPTION

It should, of course, be understood that the description and drawings herein are merely illustrative and that various modifications and changes can be made in the structures disclosed without departing from the present disclosure. In general, the figures of the exemplary saddle-ride type vehicle are not to scale. It should be appreciated that the term "plurality" means "two or more", unless expressly specified otherwise. It will also be appreciated that the various identified components of the exemplary saddle-ride type vehicle disclosed herein are merely terms of art that may vary from one manufacturer to another and should not be deemed to limit the present disclosure.

Figure 1:
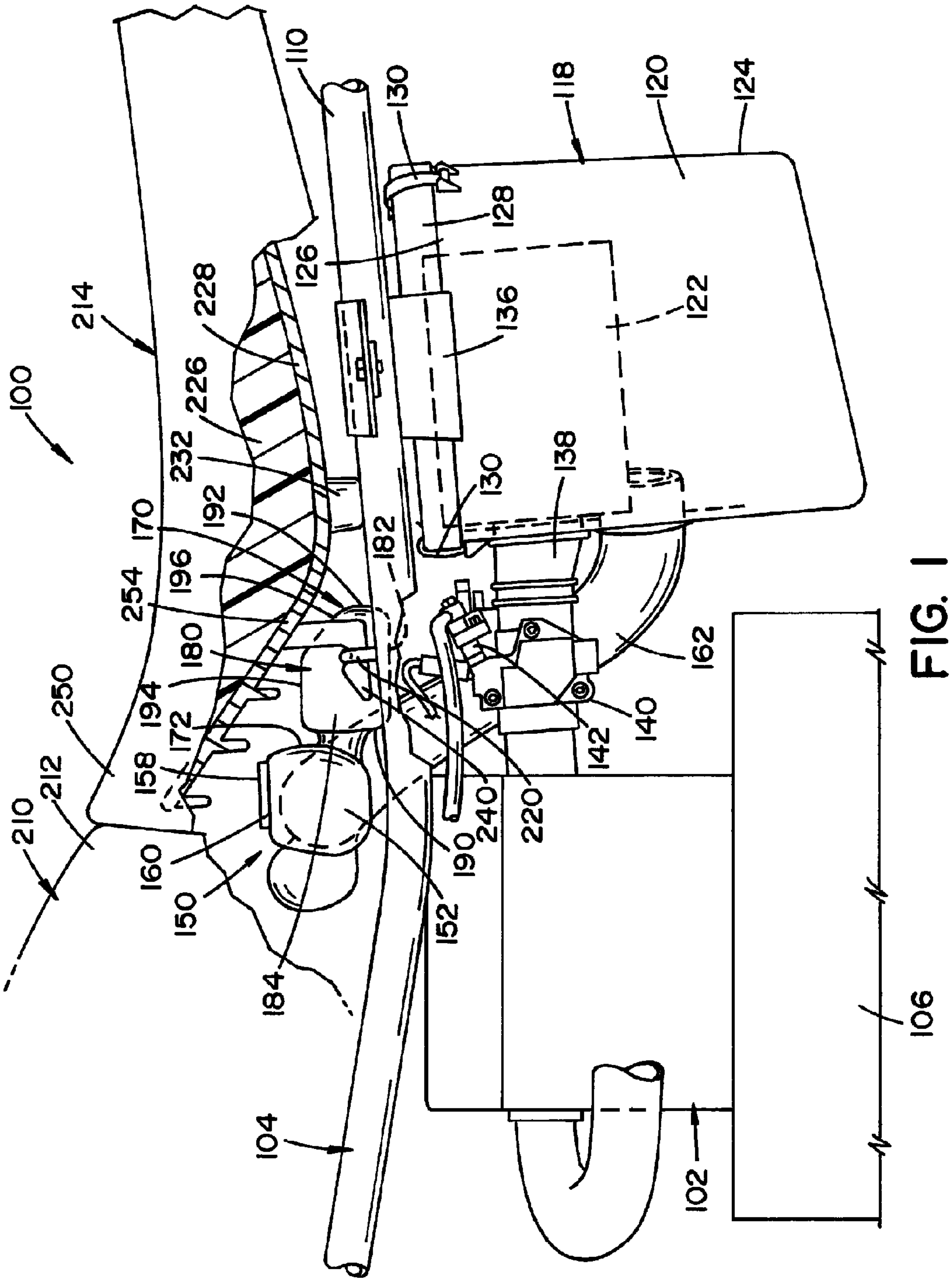
FIG. 1 is a partial side schematic view, partially broken away, of a saddle-ride type vehicle having a resonator of an air intake positioned above and covering a throttle body.
Figure 2:
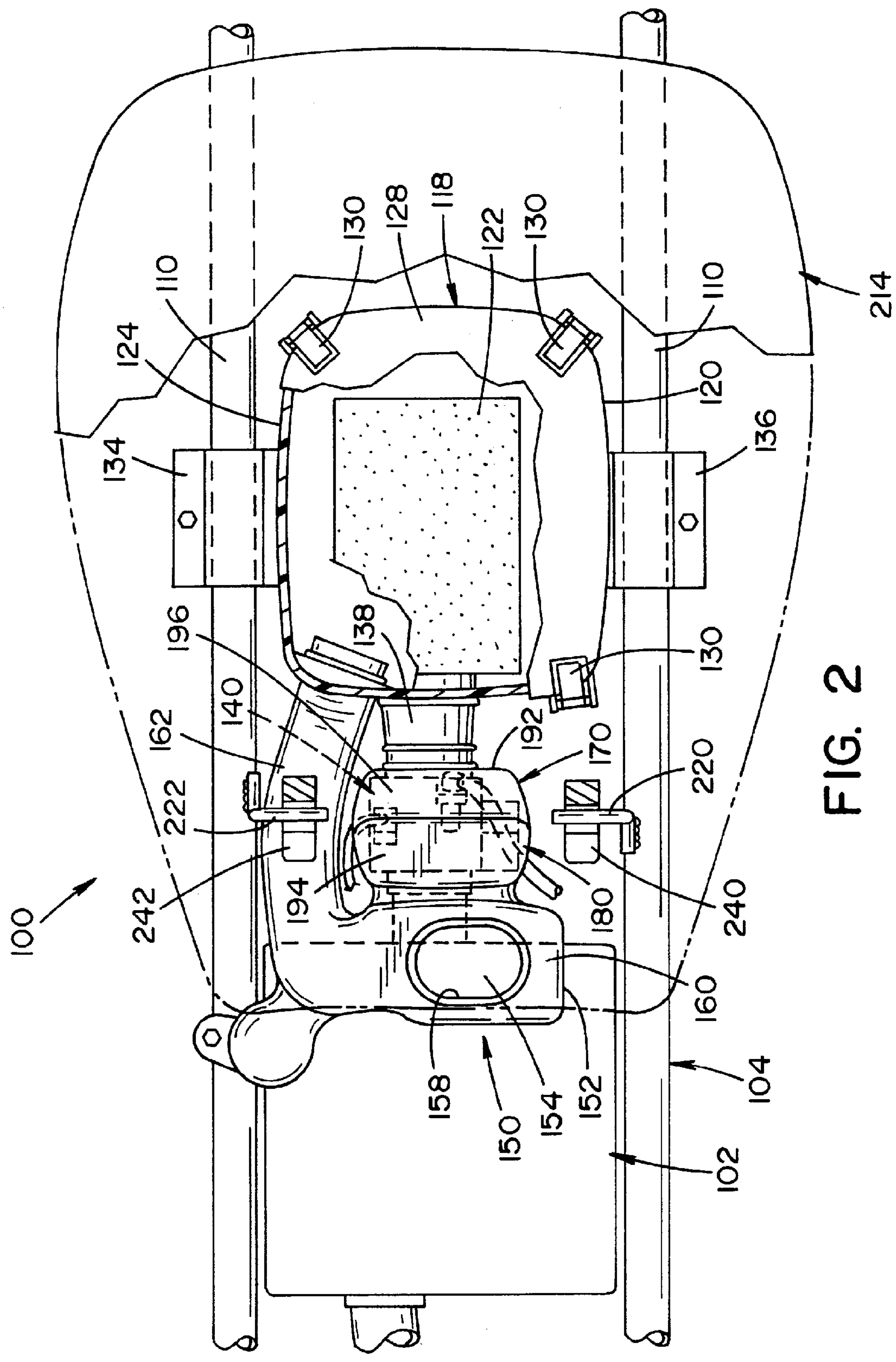
FIG. 2 is a partial top schematic view, partially broken away, of the saddle-ride type vehicle of FIG. 1.

Referring now to the drawings, wherein like numerals refer to like parts throughout the several views, FIGS. 1 and 2 depict a saddle-ride type vehicle 100, which is commonly referred to as an ATV (All Terrain Vehicle). The vehicle 100 includes an engine 102 mounted in a substantially central portion of a body frame 104 in a longitudinal layout, such that the engine power is transmitted to drive shafts (not shown) for front and rear wheels via a transmission (not shown). A crankcase 106 forms a lower portion of the engine 102 and also serves as a transmission case in which the transmission is accommodated. The body frame 104 can have a substantially box-like shape such that on each of the lateral sides of the vehicle, an upper frame member 110 and a lower frame member (not shown) each extending in a substantially longitudinal direction of the vehicle body are connected into a pipe assembly. The left and right pipe assemblies are connected to each other with a plurality of cross pipes (not shown).

An air cleaner 118 of an engine intake system is attached to a portion of the vehicle body 104 on the rear side of the engine 102. As depicted, the air cleaner 118 includes an air cleaner case or housing 120 and an air cleaner element, such as a filter element 122, disposed inside the housing 120. The housing 120 includes a body 124 having an open top portion 126. A case cover 128 closes the opening of the top portion 126. The cover 128 can be releasably connected to the body 124 via a plurality of latches 130, which can be located at corner portions of the housing 120. Although, it should be appreciated that alternative manners for connecting the cover 128 to the housing 120 are contemplated. The air cleaner 118 is also provided with a pair of laterally spaced mounting brackets 134,136 which are configured to mount the air cleaner 118 to the body frame 104, particularly the upper frame members 110. The air cleaner 118 is connected via a connecting pipe 138 to a throttle body 140, and the throttle body 140 is connected to an air suction portion on the rear side of a cylinder head of the engine 102. As is well known, an injector 142 as a fuel introducing portion is assembled to the throttle body 140 so that a fuel supplied from a fuel pump (not shown) is ejected into an air intake passage under control by a controller (not shown).

Figure 3:
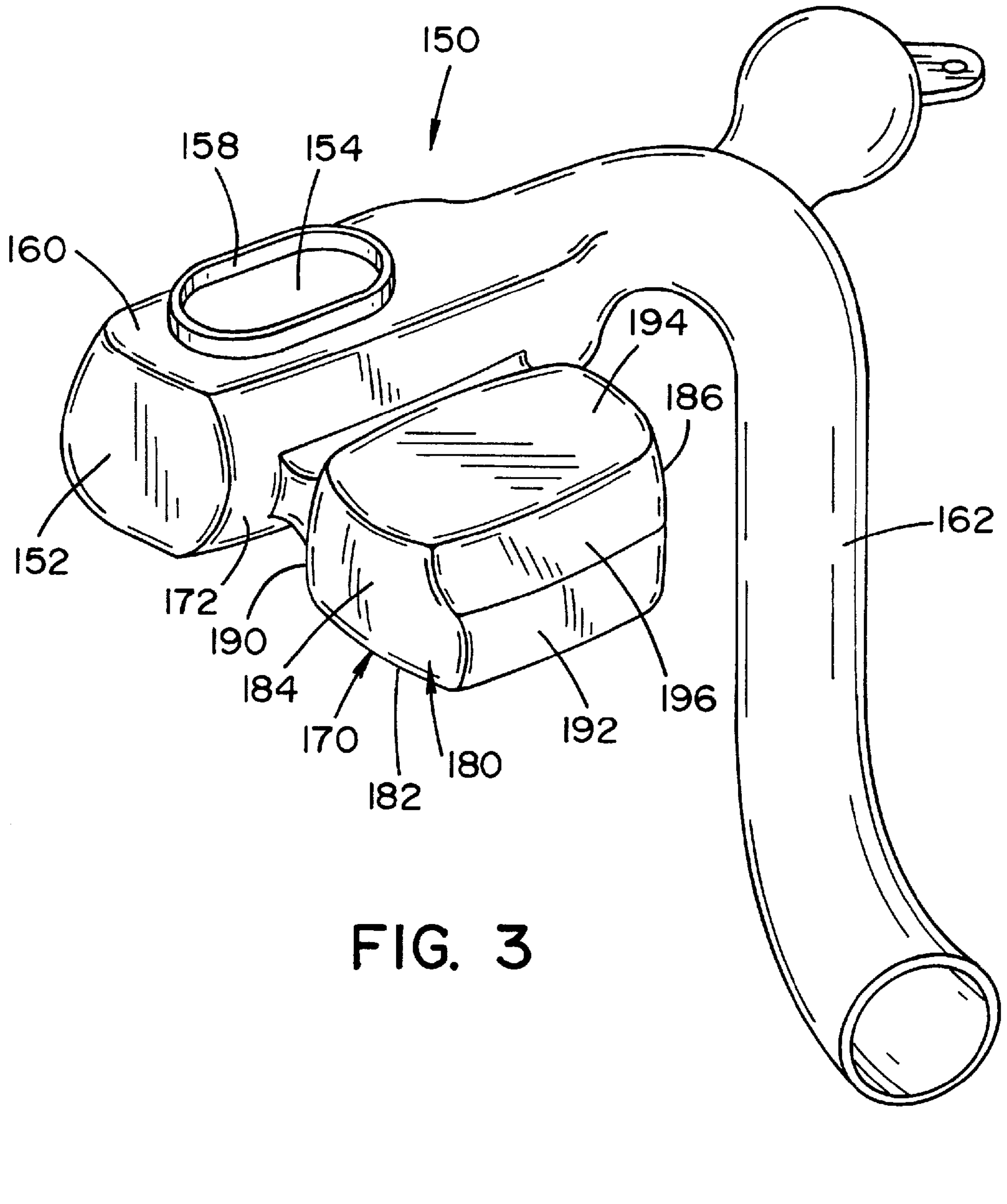
FIG. 3 is a perspective view of the air intake of FIG. 1.

An air intake 150 is disposed upward and frontward of the air cleaner 118. As shown in FIG. 3, the air intake 150 includes and intake housing 152 defining an intake chamber 154. An air inlet 158 is formed on a top portion 160 of the intake housing 152, and outside air is introduced into the intake chamber 154 from the air inlet 158. An intake duct 162, which forms part of the air intake 150, is located at a position off of the throttle body 140 in the transverse direction of the vehicle (FIG. 2). The intake duct 162 extends downwardly from the intake housing 152 and fluidly connects the intake housing 152 and the air cleaner 118. A resonator 170 is coupled to a rear sidewall 172 of the intake housing 152. As is well known, with the resonator 170, air flow resistance associated with the air intake 150 is lowered to prevent the generation of pulsation noise and intake noise associated with the air cleaner 118 can be deadened. The resonator 170 is positioned inside of the intake duct 162 and between the intake housing 152 and air cleaner 118 in a substantially central portion of a body frame 104. The resonator 170 includes a body 180 having a bottom wall 182, a pair of spaced side walls 184,186, a forward wall 190, a rear wall 192, and a top wall 194. The top wall 194 is offset forwardly from the bottom wall 182 and rear wall 192, and is connected to the rear wall 192 via an inclined wall 196. The inclined wall 196 is canted toward the rear wall 196 and interconnects the top wall and rear wall. It will be appreciated that the resonator 170 may have various different configurations within the scope of the present disclosure. As will be discussed in greater detail below, the resonator 170 is disposed on an upper side of the throttle body 140. With this positioning, the resonator 170 covers and protects the throttle body 140 thereby eliminating the need for a separate protective cover located above the throttle body (i.e., the vehicle 100 is devoid of a separate protective cover for the throttle body 140).

With reference again to FIGS. 1 and 2, a fuel tank 210 is disposed above the engine 102. On the rear side 212 of the fuel tank 210, a saddle-ride type seat 214 is disposed to cover the upper sides of the air cleaner 118, air intake 150, throttle body 140, and other vehicle elements. As is well known, the seat 214 is attached to the body frame 104 via a pair of engagement members 220,222 and is configured to be opened and closed. More particularly, the seat 214 includes a cushion 226 mounted to a substantially rigid seat pan 228. Provided on a bottom surface of the seat pan 228 is a pair of generally resilient contact members (only the left contact member 232 is shown in FIG. 1) which engages the upper frame members 110 of the body frame 104. A pair of generally L-shaped hooks 240,242 are also connected to the seat pan 228 forward from the contact members 232. As shown, the pair of engagement members 220,222 is a pair of frame seat hooks located adjacent the rear side 212 of the fuel tank 210. Each frame seat hook is attached to one of the laterally spaced upper frame members 110. The frame seat hooks 220,222 are engaged by the hooks 240,242 when the seat is in the closed position. Typically, to move the seat 214 to the open position, a seat lock (not shown) is provided on a rear of the seat, and engages a portion of the frame body 104. Actuation of the seat lock disengages the rear of the seat 214 from the frame body 104 and allows the seat to pivot upwardly toward the fuel tank 210 via the connection of the hooks 240,242 with the frame seat hooks 220,222. It should also be appreciated that the seat 214 can be completely removed from the frame body 104, and alternative embodiments of the seat may be attached with a single engagement member.

Therefore, in the open position of the seat 214, the air cleaner 118, air intake 150, and throttle body 140 that are located under the seat 214 are exposed to the outside of the vehicle 100. To protect the throttle body 140 from damage when the seat 214 is moved to one of the open position and closed position, the resonator 170 is at least partially positioned in a space defined between the pair of seat engagement members 220,222 (i.e., frame seat hooks), and is vertically interposed between a forward portion 250 of the seat 214 and the throttle body 140. As shown in FIGS. 1 and 2, the air intake 150, specifically the intake housing 152, is positioned forward of the seat hooks. The resonator 170 is at least partially located below the frame seat hooks, a portion of the bottom wall 182 of the resonator 170 extends rearwardly of the frame seat hooks 220,222, and the top wall 194 of the responator is positioned forward of the frame seat hooks. As shown in FIG. 2, with this location of the resonator 170, a periphery of the resonator 170 substantially encompasses and covers the throttle body 140. Further, to provide for a compact layout, there is no additional vehicle component positioned between the resonator 170 and the seat 214. As depicted, the seat pan 228 has a forward portion 254 positioned directly above the resonator 170. The forward portion 254 of the seat pan 228 is inclined upwardly toward the rear end 212 of the fuel tank 210. The inclined wall 196 of the resonator 170, which again is canted toward the rear wall 192, defines a plane which is substantially parallel to the forward portion 254 of the seat pan.

With the above spacial configuration of the resonator 170 relative to the throttle body 140 and the seat 214, even when a load is imposed on the resonator 170 from the upper side, the load does not act on the throttle body 140. Therefore, when the seat 214 is pressed toward the upper surface of the throttle body 140 upon closing, direct contact between the seat 214 or another vehicle component and the throttle body 140 is prevented by the presence of the resonator 170; and any indirect input force between the load and the throttle body 140 via the resonator 140 does not occur. Further, any disturbance such as, for example, adhesion of foreign matter and/or input of an external force therefore does not tend to adversely act on the injector 142 of the throttle body 140 or have adverse effects in its immediate vicinity upon opening and closing of the seat 214, resulting in a stable and highly accurate control of fuel injection by the injector 142.

The present disclosure further provides a method of protecting the throttle body 140. As indicated above, the engine 102 is attached to the body frame 104 and the fuel tank 210 is disposed above the engine. The seat 214 is also attached to the body frame 104 on the rear side 212 of the fuel tank 210 via the pair of frame seat hooks 220,222 in spaced relation to one another. The resonator 170 is coupled to the air intake 150. The method comprises positioning the throttle body 140 below the forward portion 250 of the seat 214 and between the pair of frame seat hooks 220,222; and positioning the resonator 170 directly above the throttle body 140 and between the pair of frame seat hooks so that a periphery of the resonator 170 substantially encompasses and covers the throttle body 140. The method further includes positioning the resonator 170 between the air intake 150 and the air cleaner 118; and locating at least a portion of the resonator 170 below the pair of frame seat hooks 220,222.

Accordingly, the present disclosure locates the resonator 170 above the throttle body 140 between opposed frame seat hooks 220,222 which secure the seat 214 to the body frame 104. By positioning the resonator 170 above the throttle body 140, the throttle body can be protected from damage and a separate protective cover can be eliminated. With the removal of the protective cover, manufacturing costs associated with the vehicle 100 can be reduced.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A saddle-ride type vehicle comprising:

an engine attached to a body frame;

a fuel tank disposed above the engine;

a seat attached to the body frame on a rear side of the fuel tank via a pair of engagement members in spaced relation to one another, the engagement members defining a space therebetween;

a throttle body associated with the engine and disposed below a forward portion of the seat; and a resonator coupled to an air intake, the resonator positioned on an upper side of the throttle body and covering and protecting the throttle body.

2. The saddle-ride type vehicle of claim 1, wherein the resonator is at least partially positioned in the space defined between the pair of seat engagement members.

3. The saddle-type vehicle of claim 2, wherein the pair of engagement members is a pair of opposed seat hooks which allow the seat to be moved between an open position and a closed position, the seat hooks located adjacent the rear side of the fuel tank.

4. The saddle-type vehicle of claim 2, wherein the air intake is positioned forward of the seat hooks.

5. The saddle-type vehicle of claim 2, wherein the resonator includes a body having a bottom wall, a pair of spaced side walls and a top wall offset forwardly from the bottom wall, a portion the bottom wall of the resonator body extends rearwardly of the engagement members, and the top wall of the resonator body is positioned forward of the engagement members.

6. The saddle-type vehicle of claim 2, wherein the resonator is vertically interposed between the seat and the throttle body.

7. The saddle-type vehicle of claim 1, wherein the resonator is disposed below the forward portion of the seat and is positioned at least partially below the engagement members, and the seat further includes a seat pan having a forward portion positioned directly above the resonator.

8. The saddle-type vehicle of claim 7, wherein there is no further vehicle component positioned between the resonator and the seat pan.

9. The saddle-type vehicle of claim 1, wherein a periphery of the resonator substantially encompasses the throttle body.

10. The saddle-type vehicle of claim 1, wherein the vehicle is devoid of a protective cover for the throttle body.

11. A saddle-ride type vehicle comprising:

an engine attached to a body frame;

a fuel tank disposed above the engine;

a seat attached to the body frame on a rear side of the fuel tank via at least one engagement member;

a throttle body associated with the engine and disposed below a forward portion of the seat; and a resonator coupled to an air intake, the resonator positioned on an upper side of the throttle body, a periphery of the resonator substantially encompasses and covers the throttle body so as to cover and protect the throttle body, the positioning of the resonator relative to the throttle body eliminating the need for a separate protective cover.

12. The saddle-type vehicle of claim 11, wherein the at least one engagement member includes a pair of engagement members in spaced relation to one another, the engagement members defining a space therebetween.

13. The saddle-type vehicle of claim 12, wherein the pair of engagement members is a pair of opposed seat hooks, and the resonator includes a body having a bottom wall, a pair of spaced side walls, a forward wall, a rear wall and a top wall offset forwardly from the rear wall, wherein the bottom wall of the resonator body is located below the pair of seat hooks and substantially encompasses the throttle body.

14. The saddle-type vehicle of claim 13, wherein the seat further includes a seat pan, a forward portion of the seat pan being inclined upwardly toward the rear end of the fuel tank, and the resonator body further includes an inclined wall connected to the top wall and canted toward the rear wall, a plane defined by the inclined wall of the resonator being substantially parallel to the forward portion of the seat pan.

15. The saddle-type vehicle of claim 14, wherein a portion the bottom wall of the resonator body extends rearwardly of the seat hooks, and the top wall of the resonator body is positioned forward of the seat hooks.

16. The saddle-type vehicle of claim 12, wherein the resonator is positioned at least partially below the pair of engagement members.

17. The saddle-type vehicle of claim 11, wherein the vehicle is devoid of a protective cover for the throttle body.

18. A method of protecting a throttle body of a saddle-type vehicle, the saddle-type vehicle including an engine attached to a body frame, a fuel tank disposed above the engine, a seat attached to the body frame on a rear side of the fuel tank via a pair of seat hooks in spaced relation to one another, and a resonator coupled to an air intake, the method comprising:

positioning the throttle body below a forward portion of the seat and between the pair of seat hooks; and positioning the resonator directly above the throttle body and between the pair of seat hooks so that a periphery of the resonator substantially encompasses and covers the throttle body.

19. The method of claim 18, further comprising positioning the resonator between the air intake and an air cleaner.

20. The method of claim 18, further comprising locating at least a portion of the resonator below the pair of seat hooks.

* * * * *